United States Patent
Reuschel

(10) Patent No.: US 8,142,328 B2
(45) Date of Patent: Mar. 27, 2012

(54) METHOD FOR CONTROLLING A STARTING CLUTCH

(75) Inventor: Michael Reuschel, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 945 days.

(21) Appl. No.: 12/215,181

(22) Filed: Jun. 25, 2008

(65) Prior Publication Data

US 2009/0017988 A1 Jan. 15, 2009

(30) Foreign Application Priority Data

Jul. 5, 2007 (DE) .......................... 10 2007 031 387

(51) Int. Cl.
*B60W 10/02* (2006.01)

(52) U.S. Cl. .............................. 477/6; 477/5; 180/65.275

(58) Field of Classification Search ................. 477/2, 3, 477/5, 6, 7, 8; 180/65.21, 65.275, 65.28, 180/65.285; 903/904, 912, 913, 914, 915, 903/940, 941, 942, 946

See application file for complete search history.

(56) References Cited

U.S. PATENT DOCUMENTS

| | | | | |
|---|---|---|---|---|
| 5,916,061 A * | 6/1999 | Koyama et al. | ................ | 477/175 |
| 6,018,198 A * | 1/2000 | Tsuzuki et al. | .................. | 290/17 |
| 6,026,921 A * | 2/2000 | Aoyama et al. | ............. | 180/65.25 |
| 6,077,186 A * | 6/2000 | Kojima et al. | ..................... | 477/3 |
| 6,105,743 A * | 8/2000 | Salecker et al. | ............. | 192/84.6 |
| 6,171,212 B1 * | 1/2001 | Reuschel | ........................ | 477/86 |
| 6,364,807 B1 * | 4/2002 | Koneda et al. | .................... | 477/5 |
| 6,558,290 B2 * | 5/2003 | Phillips et al. | ..................... | 477/5 |
| 6,849,026 B2 * | 2/2005 | Sakamoto et al. | ................ | 477/5 |
| 6,889,645 B2 * | 5/2005 | Tumback et al. | .......... | 123/179.3 |
| 6,939,265 B2 * | 9/2005 | Rustige et al. | .................. | 477/84 |
| 6,988,605 B2 * | 1/2006 | Senger et al. | ............. | 192/103 F |
| 7,114,585 B2 * | 10/2006 | Man et al. | .................. | 180/65.21 |
| 7,121,390 B2 * | 10/2006 | Reuschel | ..................... | 192/3.58 |
| 7,158,873 B2 * | 1/2007 | Eich et al. | ........................ | 701/68 |
| 7,273,119 B2 * | 9/2007 | Tsuneyoshi et al. | ........ | 180/65.28 |
| 7,306,539 B2 * | 12/2007 | Amendt et al. | .................. | 477/79 |
| 7,351,182 B2 * | 4/2008 | Kobayashi | ........................ | 477/5 |
| 7,367,415 B2 * | 5/2008 | Oliver et al. | ............ | 180/65.275 |
| 7,370,715 B2 * | 5/2008 | Colvin et al. | ............. | 180/65.28 |
| 7,377,344 B2 * | 5/2008 | Barske | ........................ | 180/65.28 |
| 7,426,972 B2 * | 9/2008 | Tabata et al. | ................ | 180/65.22 |
| 7,637,842 B2 * | 12/2009 | Tamai et al. | ....................... | 477/6 |
| 7,717,248 B2 * | 5/2010 | Reuschel | ..................... | 192/54.4 |
| 7,770,678 B2 * | 8/2010 | Nozaki et al. | ................ | 180/65.6 |
| 7,784,575 B2 * | 8/2010 | Yamanaka et al. | ........ | 180/65.275 |
| 7,824,307 B2 * | 11/2010 | Matsubara et al. | ................ | 477/5 |

(Continued)

FOREIGN PATENT DOCUMENTS

DE 198 38 853 A1 3/1999

(Continued)

*Primary Examiner* — J. Allen Shriver, II
*Assistant Examiner* — Jacob Meyer
(74) *Attorney, Agent, or Firm* — Davidson, Davidson & Kappel, LLC

(57) ABSTRACT

A method for actuating a starting clutch in the power train of a hybrid vehicle, where during a starting phase of the combustion engine by means of an electric machine the starting clutch operating between them is engaged in a first starting phase by means of a pre-control and in a second starting phase depending on the acceleration of the crankshaft of the combustion engine.

9 Claims, 3 Drawing Sheets

U.S. PATENT DOCUMENTS

| | | |
|---|---|---|
| 7,878,281 B2 * | 2/2011 | Tanishima ............... 180/65.265 |
| 7,896,114 B2 * | 3/2011 | Colvin et al. ............... 180/65.28 |
| 7,938,209 B2 * | 5/2011 | Dilzer et al. ............... 180/65.28 |
| 2002/0117860 A1 * | 8/2002 | Man et al. ........................ 290/46 |
| 2003/0110875 A1 * | 6/2003 | Brandt ............................ 74/335 |
| 2004/0173393 A1 * | 9/2004 | Man et al. .................... 180/65.2 |
| 2005/0056513 A1 * | 3/2005 | Reuschel .................... 192/3.58 |
| 2005/0155803 A1 * | 7/2005 | Schiele ........................ 180/65.2 |
| 2007/0056784 A1 * | 3/2007 | Joe et al. ...................... 180/65.2 |
| 2007/0080005 A1 * | 4/2007 | Joe ............................... 180/65.2 |
| 2007/0099749 A1 * | 5/2007 | Zillmer et al. .................... 477/3 |
| 2007/0199790 A1 * | 8/2007 | Whitmer et al. ......... 192/70.252 |
| 2008/0189018 A1 * | 8/2008 | Lang et al. ....................... 701/54 |
| 2009/0011899 A1 * | 1/2009 | Reuschel ........................... 477/5 |
| 2009/0037060 A1 * | 2/2009 | Carlhammar et al. .......... 701/54 |
| 2009/0255743 A1 * | 10/2009 | Dilzer et al. ............. 180/65.265 |

FOREIGN PATENT DOCUMENTS

| | | |
|---|---|---|
| DE | 102 60 435 A1 | 7/2004 |
| DE | 102 60 838 A1 | 7/2004 |
| DE | 10 2004 002 061 A1 | 8/2005 |
| DE | 10 2004 032 173 A1 | 2/2006 |
| EP | 0 922 600 A2 | 6/1999 |
| EP | 1 762 452 A2 | 3/2007 |

* cited by examiner

METHOD FOR CONTROLLING A STARTING CLUTCH

This claims benefit of German Patent Application 10 2007 031 387.1, filed Jul. 5, 2007, and hereby incorporated by reference herein.

The invention relates to a method for actuating a starting clutch in a hybrid vehicle having a combustion engine and an electric machine, wherein the starting clutch is actuated in the direction of engagement to start the combustion engine by the electric machine.

BACKGROUND

Hybrid vehicles are known from the existing art that have a combustion engine, and an electric machine that may be designed for booster operation, for recuperation, and for sole propulsion of the vehicle. In hybrid vehicles of this sort, the electric machine is also used by preference to start the combustion engine. To this end, a starting clutch is disengaged before the combustion engine is started, so that the electric machine can first be accelerated. That is followed by a so-called impulse start by engaging the starting clutch. Such impulse starts are generally critical in terms of comfort, in particular when restarting the hybrid vehicle after shutting off the combustion engine during a vehicle stop, for example at traffic lights or railway crossings or other stops where travel is to be resumed again after a short time. In such situations the driver does not expect any sacrifice of comfort induced by the starting process.

SUMMARY OF THE INVENTION

An object of the invention is to improve a starting process in terms of comfort, in particular when restarting the hybrid vehicle. Furthermore, the improvement of a starting process should also improve the long-term stability of the starting clutch, without necessitating an increased outlay for components.

The present invention provides a method for actuating clutch in a hybrid vehicle having a combustion engine with a crankshaft and an electric machine with a rotor, where to start the combustion engine the electric machine is accelerated to a predetermined speed and the starting clutch operating between the electric machine and the combustion engine is added depending on a target torque to be transmitted through the starting clutch, wherein in a first starting phase the target torque is set to a predefined value and in a second starting phase when starting of the combustion engine has been detected the target torque is regulated depending on the acceleration of the crankshaft.

The term hybrid vehicles as used in the invention is understood to mean all vehicles with a combustion engine and an electric machine that can be coupled with the latter by means of a starting clutch. Depending on the configuration of the power train, the starting clutch can also be use to add the electric machine to the combustion engine while driving, so that the latter supports booster operation of the hybrid vehicle. Furthermore, by means of the starting clutch the electric machine can be uncoupled and connected to the power train, in order to provide for propulsion only with the electric machine, or in order to be able to recuperate when coasting without any torque load on the combustion engine. The electric machine and/or the combustion engine can be connected to the transmission by means of at least one additional clutch, for example a friction clutch—or in the case of a dual clutch transmission by means of two friction clutches—or by means of a fluid clutch such as a torque converter.

The starting clutch can be a dry or wet friction clutch, which can be actuated electrically, hydraulically, electrohydraulically or electromechanically. It can be a pressure-engaged, tension-engaged, pressure-disengaged or tension-disengaged clutch.

The determination of the torque transmitted through the starting clutch, which is set on the basis of the predefined target torque, is accomplished in an advantageous manner by assigning a clutch path to an adaptable clutch characteristic. Another option is a calculation from engine data and the slippage in effect at the starting clutch.

The method may be used in an advantageous manner for restarting after shutting down the combustion engine while the vehicle is stopped. Following increasingly strict exhaust gas regulations, a shut-down of the combustion engine to save fuel and the associated reduction in pollutant emissions is especially beneficial when the combustion engine may be started by means of the proposed method.

The value specified in the first starting phase for the target torque can be designed for example so that the combustion engine can be started reliably under normal conditions. Data from test stand measurements can be drawn upon for this purpose. The value can be adapted; for example, additional influencing variables such as the starting temperature, data concerning the state of the combustion engine and the like can be included in determining the target torque. This target torque can be regarded as a pre-control value, and as a pre-control value it can be varied over the time that has passed since the inception of the first starting phase. This has proven to be advantageous, in particular when the combustion engine does not start under the target torque initially applied, or when there may be no recognizable signs that the combustion engine will start when fired. First responses of the latter, for example changes in the speed of rotation, can be evaluated as indications of the beginning of a start. It has proven particularly advantageous when the target torque is increased in the first starting phase depending on the time since the beginning of the starting phase, until a start of the combustion engine is detected. A torque increase of this sort can follow a ramp pattern; a characteristic curve can also be stored in the controller which reproduces a time-dependent target torque as a function of the time since the beginning of the starting phase and which can be used as a control value for the target torque. A characteristic curve can be used in particular to store non-linear changes, which are matched for example to the typical properties of the combustion engine and to other parameters of influence, for example the behavior of the clutch and/or of the electric machine. If there is no recognizable sign of a start of the combustion engine after a predefined time, despite an increase in the pilot target torque, it can be advantageous to engage the clutch up to a maximum transmissible torque, in order to bring about a reliable but less comfortable start in this exceptional case. An increase in the pre-control values can advantageously be far less than a second, preferably less than or equal to 200 mS, so that the regulation of the starting clutch corresponding to the second starting phase can occur with high probability within a second.

The second starting phase may comprise regulating the speed of rotation of the crankshaft to a predefined target speed, to which the combustion engine may be brought depending on the acceleration of the crankshaft by setting the target torque depending on the acceleration in such a way that the starting clutch changes over from slipping to adhering or merely slightly slipping operation and the rotational speeds of the combustion engine and the electric machine may be largely matched to each other. It can be beneficial here if a target acceleration used for the regulation is determined independent of the difference in speed of rotation between the crankshaft and the rotor. Here too, the desired target acceleration can be recorded in a control unit in the form of a characteristic curve depending on the difference in speed of rotation and can be used in a regulation depending on the difference in speed of rotation, in which case when there is a large difference in the speed of rotation a high target acceleration may be assigned, and when the speed is the same a very small target acceleration or none at all may be assigned.

When the rotational speed difference is largely matched, the starting clutch can be operated without slippage by engaging the starting clutch completely. It can also be operated at less than the maximum transmissible torque with slippage, in particular to damp vibrations that can be transmitted from the combustion engine through the starting clutch, so that when there are peaks in torque the starting clutch slips and does not transmit these to the downline power train.

BRIEF DESCRIPTION OF THE DRAWINGS

The invention will be explained in greater detail on the basis of FIGS. 1 through 5. The figures show the following.

DETAILED DESCRIPTION

Figure 1:
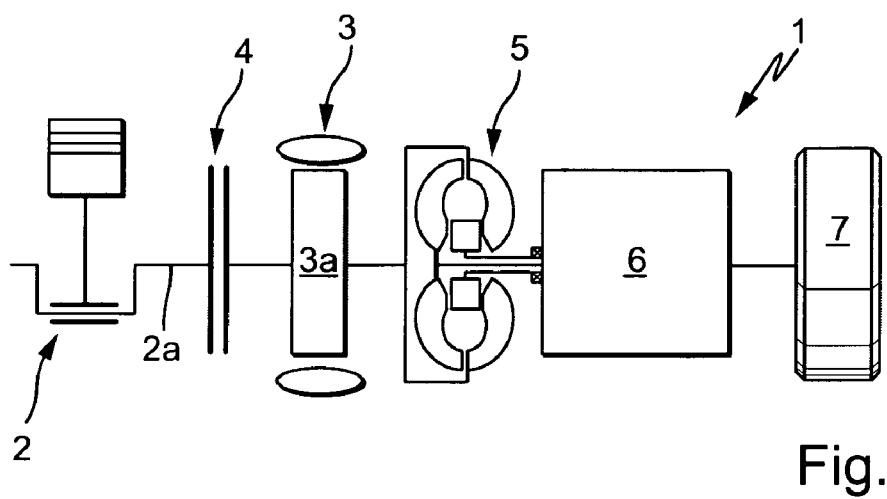
FIG. 1: an exemplary embodiment of a power train of a hybrid vehicle.

FIG. 1 shows an exemplary embodiment of a power train 1 having a combustion engine 2 with a crankshaft 2a, an electric machine 3 with a rotor 3a, and a starting clutch 4 operating between the combustion engine 2 and the electric machine 3. Another clutch, which is designed as a torque converter 5 in the exemplary embodiment shown, which can have a torque converter lockup clutch in addition, is situated between the transmission 6 and the electric machine 3. The transmission 6 transmits the drive torque generated individually or jointly by the drive units in the form of the combustion engine 2 and the electric machine 3 to the drive wheels 7. If the combustion engine 2 is to be the exclusive transmitter of torque when the starting clutch 4 is engaged, the current to the electric machine is shut off; in this case the rotor 3a serves as centrifugal mass. When current is flowing to the electric machine and the starting clutch 4 is engaged, both drive units transmit torque to the transmission 6. If only the electric machine 3 is to provide propulsion, starting clutch 4 is disengaged. If braking is to be provided by electric machine 3, starting clutch 4 is disengaged and electric machine 3 is operated as a generator. In addition, the drag torque of combustion engine 2 can be utilized to achieve a greater retarding effect by engaging starting clutch 4.

When starting combustion engine 2 when beginning to drive or after combustion engine 2 is shut down when stopped, the torque converter lockup clutch of the torque converter is disengaged or a neutral position is set in transmission 6 and starting clutch 4 is disengaged, so that rotor 3a of electric machine 3 can be accelerated by being supplied with electricity. The acceleration proceeds up to a predefined speed. After that the starting clutch is engaged in accordance with the proposed method.

Figure 2:
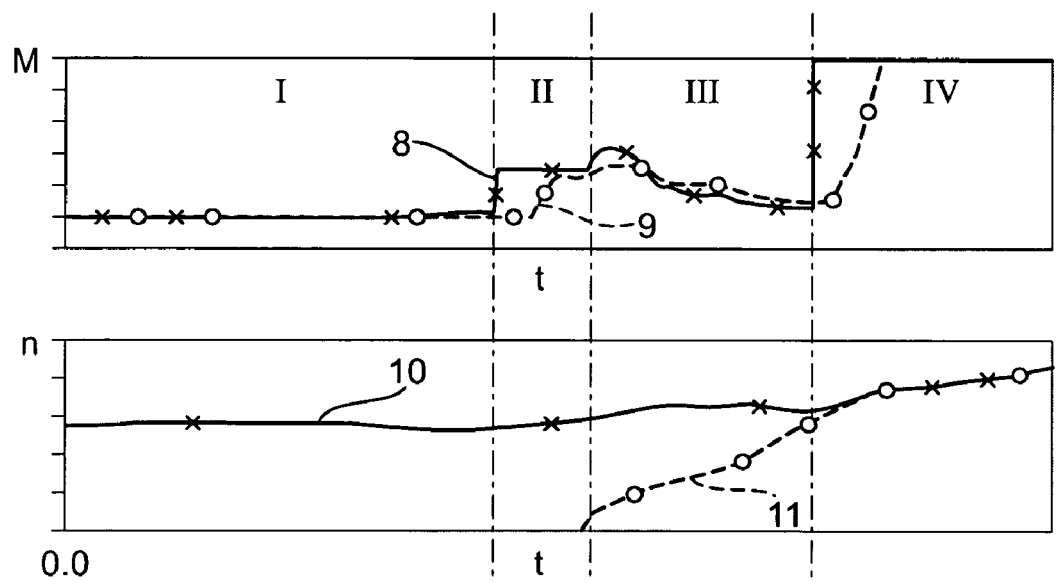
FIG. 2: a diagram to illustrate a restart of a combustion engine as a function of the time.

In this connection, in a two-part diagram based on the exemplary embodiment described in FIG. 1, FIG. 2 shows in the upper part the change in the torque M and in the lower part the speed of rotation n over time t. Curve 8 with the x marks shows the change in the target torque to be transmitted via starting clutch 4, and curve 10 shows the speed of rotation of electric machine 10. The two figures identified with the marks show in the form of curve 9 the actual torque transmitted via the starting clutch, and in the form of curve 11 the rotational speed of the crankshaft 2a of combustion engine 2. During the acceleration phase I of electric machine 3 starting clutch 4 transmits no torque, since it is completely disengaged and no target torque is specified. Curve 10 already shows the accelerated value of the rotational speed of the electric machine with a nearly constant speed value. At the beginning of the pre-control phase II, a pre-controlled value of the target torque is specified to control the clutch. With a corresponding delay resulting from the natural signal/response behavior of the friction clutch, the target torque is converted to an actual torque, which acts on the crankshaft and excites the combustion engine. In the exemplary embodiment shown, the combustion engine responds immediately within the prescribed time interval. Hence there is no need to employ an additional elevated target torque in pre-control phase II. Under bad conditions in particular a higher load torque on the combustion engine may be necessary, for example when the operating temperature has not yet been reached or when there are other influences that increase the internal friction of the combustion engine, and the starting clutch 4 which is set to the prescribed target torque slips. In that case, after the specified time has passed, after the first value for the prescribed target torque has been applied the value is increased. This iteration loop can be run through until a predetermined time has passed. If a start of the combustion engine still cannot be detected, without the regulating phase III the starting clutch is immediately engaged for the maximum transmissible torque, with slight slippage at most to damp vibrations, corresponding to the end phase IV.

When controlling a starting clutch by means of a target torque, the determined target torque is assigned a physical control variable for a clutch actuator, for example a clutch travel checked by a travel sensor system or a contact pressure, in particular when using a hydraulically operated clutch actuating system. It goes without saying that these values assigned to the target torque can be calibrated and adapted, in order to be able to compensate for changing mechanical and physical influences.

After the end of pre-control phase 2, the specification of the target torque in regulating phase III gives way to acceleration-dependent regulation, in which the target torque is determined depending on the acceleration of the crankshaft 2a. The acceleration can be determined by evaluating the difference in speed of rotation between crankshaft 2a and rotor 3a. It is clear from curve 8 that when the difference in speed of rotation is great at the beginning of regulating phase III a rising target torque is issued, which passes through a maximum and decreases again as the speeds of crankshaft 2a and rotor 3a become equalized. The rotational speeds are continuously brought closer to each other by this acceleration regulation. After a predefinable threshold in the speed difference or some other variable derivable from the acceleration, when the speeds of rotation of the crankshaft 2a and the rotor 3a substantially agree, in end phase IV the starting clutch is completely engaged. As mentioned earlier, an engaged starting clutch 4 means a clutch that is engaged up to a maximum transmissible torque, or a clutch that is engaged only to a transmissible torque at which torsional vibrations due to the combustion process of the combustion engine are filtered by partial slippage.

Figure 3:
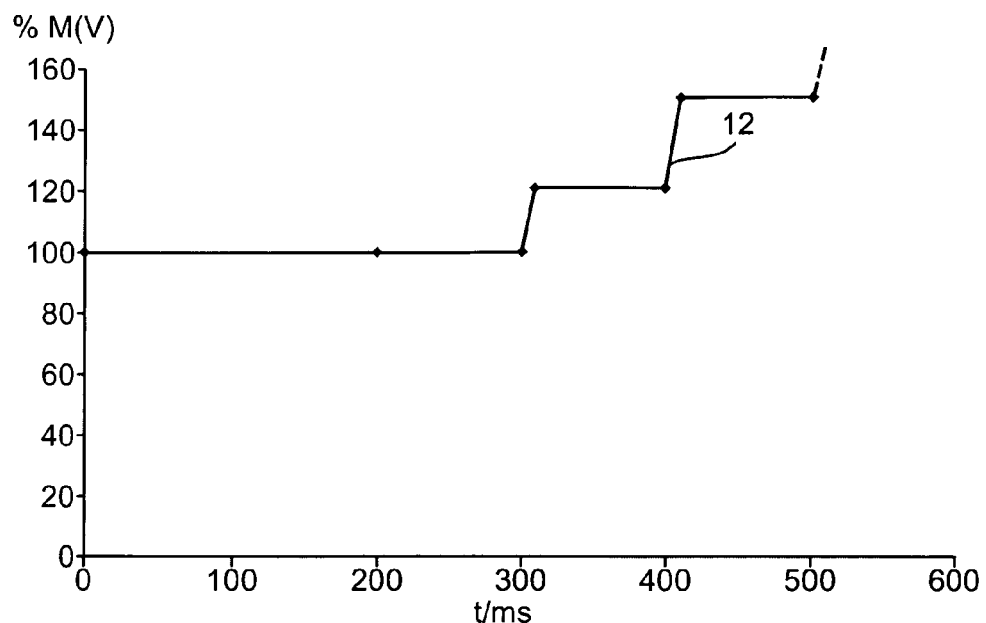
FIG. 3: a diagram with a characteristic curve of the pilot torque as a function of the time.

FIG. 3 shows a diagram 12 in which the development of the pre-control torque M(V) over time t is depicted as a possible exemplary embodiment. Starting from a typical pre-control torque M(V) for the start of a combustion engine at a value of 100%, this value remains constant for a defined time interval—in the range shown, approximately 300 ms. If there are no recognizable signs that the combustion engine has started, for example a detectable speed of rotation at the crankshaft, an ignition impulse or the like, the pre-control torque M(V) is increased by a definable amount, for example 20%. If there is still no beginning start of the combustion engine to be detected, another increase is made, for example by 50% of the initial value. The increase in amount of the pre-control torque M(V) can be continued over several of these cycles. After a predefined time limit has been passed, for example after 500 ms in the illustrated case, the starting clutch can be engaged completely. It is understood that the starting value of the pre-control torque M(V) can be adapted to the behavior of the hybrid vehicle, and that the pre-control torque M(V) is increased appropriately starting from this initial value as 100%. It can be beneficial to also make the number of cycles, their amounts of increase and/or the time intervals of the individual amounts dependent on the initial value.

Figure 4:
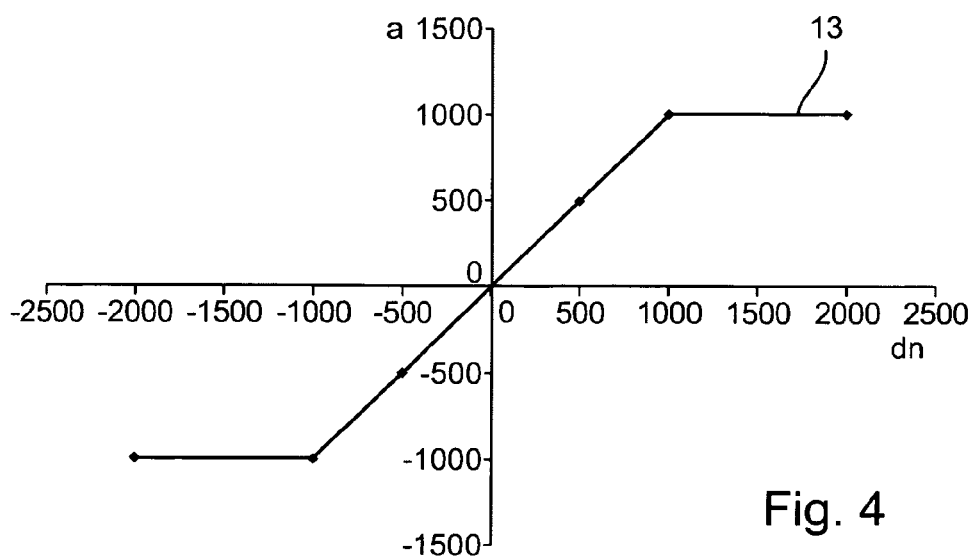
FIG. 4: a diagram with a characteristic curve of the target acceleration as a function of the difference in speed of rotation between the crankshaft and the rotor.

FIG. 4 shows a diagram 13 as an advantageous form for determining a target acceleration a in arbitrary units, depending on the speed difference dn between the rotor of the electric machine and the crankshaft of the combustion engine. With the value gained from Diagram 13 for the target acceleration, after the conclusion of the pre-control phase the target torque for the starting clutch is determined in a regulating circuit, and the actuating unit or actuator is controlled thereby. In the exemplary embodiment shown, the target acceleration a increases in a straight line in a specified interval with the difference in speed of rotation dn, or if the speed difference is negative, for example after a reversal of torque when the combustion engine overtakes the electric machine, it decreases. When a specified acceleration is reached—in this case at the values 1000 or −1000—the target acceleration a is capped at a constant value of the target acceleration a despite a continuing increase in the amount of the difference in rotational speed dn. The target acceleration can be stated advantageously in the units 1/min/sec.

Figure 5:
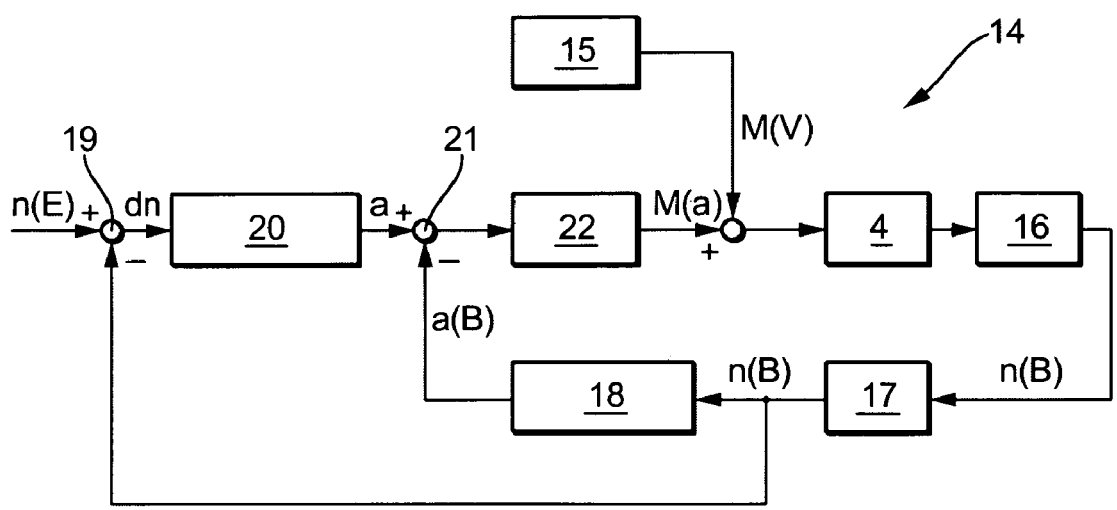
FIG. 5: an exemplary embodiment of a control unit for the clutch in the form of a block circuit diagram.

FIG. 5 shows an exemplary embodiment of a regulating circuit 14 for regulating the target torque of the starting clutch 4 (FIG. 1) during a starting procedure of the combustion engine 2. During the pre-control phase II (FIG. 2) only the pre-control 15 is active, which issues the target torque to be applied to the starting clutch 4 for example corresponding to Diagram 12 described in FIG. 3. The rotational speed signal n(B) for the combustion engine obtained from the hybrid power train 16, for example from a rotational speed sensor for the crankshaft, is filtered by means of a filter 17 and transferred to a gradient formation 18 and to the node 19. The speed n(E) of the electric machine is also present there, so that a rotational speed difference dn is forwarded to a unit 20 to determine the target acceleration, for example corresponding to Diagram 13 depicted in FIG. 4. In node 21 the target acceleration a is offset with the already present actual acceleration a(B), formed from the speed of rotation n(B) in the gradient formation 18. The corresponding control differential a(diff) is sent to a regulator 22, which is preferably a PI regulator. Regulator 22 then issues a target torque M(a) dependent on the target acceleration a or on the effective control differential a(diff) to the starting clutch 4; this target torque is added to the pre-control torque M(V).

REFERENCE LABELS

| | |
|---|---|
| 1 | hybrid power train |
| 2 | combustion engine |
| 2a | crankshaft |
| 3 | electric machine |
| 3a | rotor |
| 4 | starting clutch |
| 5 | torque converter |
| 6 | transmission |
| 7 | driving wheel |
| 8 | curve |
| 9 | curve |
| 10 | curve |
| 11 | curve |
| 12 | diagram |
| 13 | diagram |
| 14 | regulating circuit |
| 15 | pre-control |
| 16 | hybrid power train |
| 17 | filter |
| 18 | gradient formation |
| 19 | node |
| 20 | unit |
| 21 | node |
| 22 | regulator |
| a | target acceleration |
| a(B) | actual acceleration of combustion engine |
| a(diff) | control differential |
| dn | rotational speed difference |
| M | torque |
| M(a) | Acceleration-dependent torque |
| M(V) | pre-control torque |
| n | rotational speed |
| n(B) | speed of combustion engine |
| n(E) | speed of electric machine |
| t | time |
| I | acceleration phase |
| II | pre-control phase |
| III | regulating phase |
| IV | end phase |

What is claimed is:

1. A method for actuating a starting clutch in a hybrid vehicle having a combustion engine with a crankshaft and an electric machine with a rotor, wherein to start the combustion engine the electric machine is accelerated to a predetermined speed and the starting clutch operating between the electric machine and the combustion engine is engaged depending on a torque to be transmitted through the starting clutch, the method comprising:

in a first starting phase, setting a pre-control torque of said torque to a predefined value; and in a second starting phase, regulating a target torque for said torque depending on the acceleration of the crankshaft when a start of the combustion engine is detected;

wherein a target acceleration used for the regulation is determined depending on a rotational speed difference between the crankshaft and the rotor.

2. The method as recited in claim 1 wherein the start of the combustion engine is a restart after the combustion engine has been shut off while the hybrid vehicle is stopped.

3. The method as recited in claim 1 further comprising increasing the pre-control torque in the first starting phase depending on a time since the beginning of the starting phase until a start of the combustion engine is detected.

4. The method as recited in claim 3 wherein the pre-control torque is increased by a ramp pattern.

5. The method as recited in claim 3 further comprising storing the pre-control torque as a time-dependent characteristic in a control device and, further comprising setting a time-dependent pre-control torque depending on the time since the beginning of the starting phase.

6. The method as recited in claim 3 further comprising, when a prescribed maximum time is reached, increasing the pre-control torque to a maximum torque that can be transmitted through the starting clutch.

7. The method as recited in claim 1 wherein in the second starting phase the combustion engine is regulated to a prescribed target speed depending on the acceleration of the crankshaft.

8. The method as recited in claim 1 further comprising storing the target acceleration as a characteristic in a control device depending on the rotational speed difference and is used in a control depending on the rotational speed difference.

9. The method as recited in claim 1 further comprising after the start, operating the starting clutch with slippage at less than a maximum transmissible torque.

* * * * *